United States Patent [19]
Nakamura

[11] 4,174,886
[45] Nov. 20, 1979

[54] INVERTED TELEPHOTO LENS SYSTEM

[75] Inventor: Akiyoshi Nakamura, Sakai, Japan

[73] Assignee: Minolta Camera Kabushiki Kaisha, Osaka, Japan

[21] Appl. No.: 881,637

[22] Filed: Feb. 27, 1978

[30] Foreign Application Priority Data

Mar. 8, 1977 [JP] Japan .................................. 52-25661

[51] Int. Cl.² .............................................. G02B 13/04
[52] U.S. Cl. ............................................. 350/215
[58] Field of Search ............................. 350/216, 215

[56] References Cited

U.S. PATENT DOCUMENTS

| 3,318,653 | 5/1967 | Macher | 350/216 |
| 3,467,464 | 9/1969 | Ruehl  | 350/216 |

FOREIGN PATENT DOCUMENTS 45-39874 12/1970 Japan ......................................... 350/215

Primary Examiner—Conrad J. Clark
Attorney, Agent, or Firm—Jackson, Jones & Price

[57] ABSTRACT

A wide angle lens system of an inverted telephoto type is provided. The lens system comprises six separate lens groups comprising, consecutively from the object to the image side a negative meniscus lens element; a positive doublet; a positive meniscus lens element; a biconcave single lens element; a positive lens element and a rear positive lens element. One of the lens elements of the fifth and sixth groups is a single lens element while the other is a doublet. The lens is capable of providing an aperture ratio greater than F/2.0, a field angle of approximately 64 degrees and a back focal distance greater than the focal length of the system.

10 Claims, 20 Drawing Figures

FIG. 1
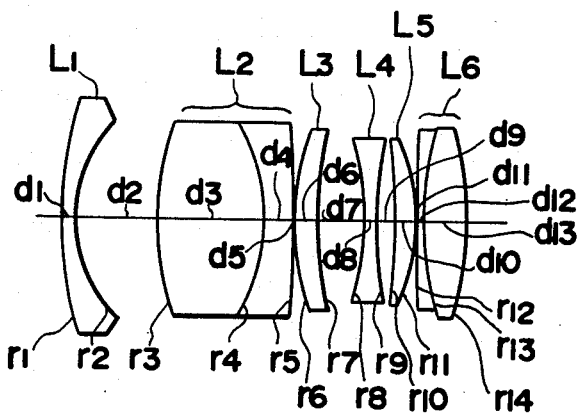
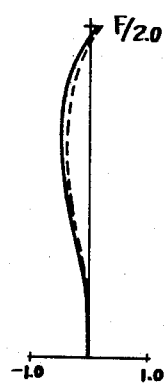
FIG.2a
— Spherical Aberration
---- Sine Condition
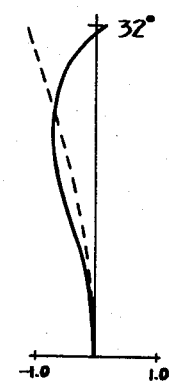
FIG.2b
Astigmatism
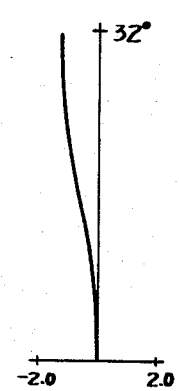
FIG.2c
Distortion —— Spherical Aberration
---- Sine Condition Astigmatism Distortion FIG.5
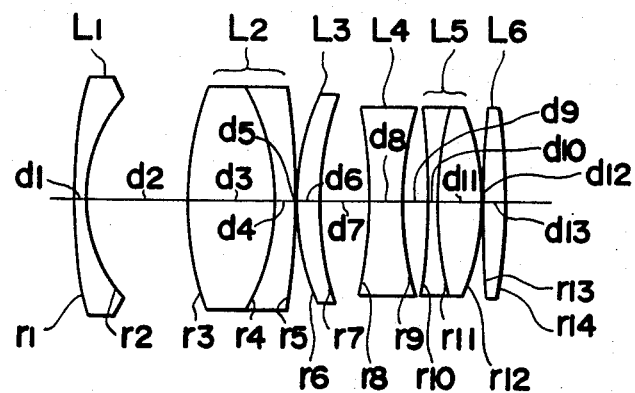
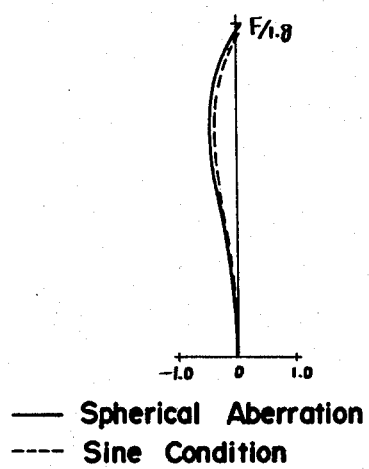
FIG.6a
— Spherical Aberration
---- Sine Condition
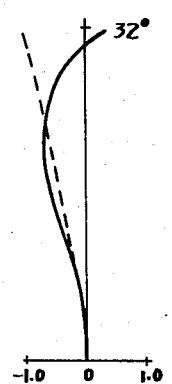
FIG.6b
Astigmatism
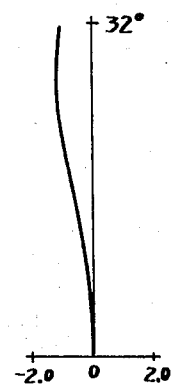
FIG.6c
Distortion —— Spherical Aberration
---- Sine Condition Astigmatism Distortion —— Spherical Aberration
---- Sine Condition Astigmatism Distortion

INVERTED TELEPHOTO LENS SYSTEM

BACKGROUND OF THE INVENTION

1. Field of the Invention

The present invention relates to an inverted telephoto type lens system for use in a single lens reflex camera and more particularly to a wide angle lens system with an aperture ratio greater than F/2.0 and a back focal distance greater than the focal length of the system.

2. Description of the Prior Art

Various wide angle lens systems of inverted telephoto type have been suggested in the prior art such as that disclosed in the German Auslegeschrift No. 1246270 and the Japanese Patent Publications Nos. 45-28832 and 45-39874.

There is still a demand in the prior art to provide a high quality wide angle inverted telephoto lens system that can be economically manufactured. More particularly there is a demand to provide these features on an inverted telephoto type lens system having a compact size.

SUMMARY OF THE INVENTION

An object of the present invention is to provide a high-speed wide angle lens system of an inverted telephoto type in a compact size.

Another object of the present invention is to provide a wide angle lens system of an inverted telephoto type with an aperture ratio greater than F/2.0, a field angle approaching 64 degrees and a back focal distance greater than the focal length of the system.

A further object of the present invention is to provide a wide angle lens system of an inverted telephoto type wherein the aberrations have been sufficiently corrected for commercial use.

The wide angle inverted telephoto lens system of the present invention comprises six separate lens groups that can be modified within various ranges to produce an operative lens embodiment of the present invention. A first front group consists of a negative meniscus single lens element convex to the object side wherein the ratio of its radii of curvature is within the following range;

$$1.5 < r_1/r_2 < 4.0$$

A second lens group consists of a positive doublet while a third lens group comprises a positive meniscus single lens element convex to the object side. The relationship of the refractive indices of the sub-lens elements forming the positive doublet can be set forth as follows;

$$0.12 < N_2 - N_3 < 0.25$$

The cemented intermediate surface of the positive doublet element, $r_4$ bears the following relationship to the total focal length, f, of the whole lens system;

$$0.5 f < |r_4| < 0.75f, \quad r_4 < 0$$

The relationship between the composite focal length, $f_{1-2}$, of the first and second groups to the total focal length of the whole lens system is as follows;

$$1.2f < f_{1-2} < 2.0 f$$

The fourth lens group consists of a biconcave single lens element while the fifth and sixth lens group are positive lens elements. One of the positive lens elements of the fifth and sixth lens groups is a single lens element while the other lens element is a doublet. The Abbe numbers of the object side doublet sub element, $\nu_I$ and the image side sub element, $\nu_{II}$ bear the following relationship.

$$15 < \nu_{II} - \nu_I < 30$$

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE DRAWINGS

FIG. 1 is a schematic cross-sectional view of a first embodiment of the present invention;

FIGS. 2a, 2b and 2c are respectively graphical plots of the abberations of the first embodiment;

FIG. 5 is a schematic cross-sectional view of a third embodiment of the present invention;

FIGS. 6a, 6b and 6c are graphical plots of the aberrations of the third embodiment;

DESCRIPTION OF THE PREFERRED EMBODIMENTS

Figure 3:
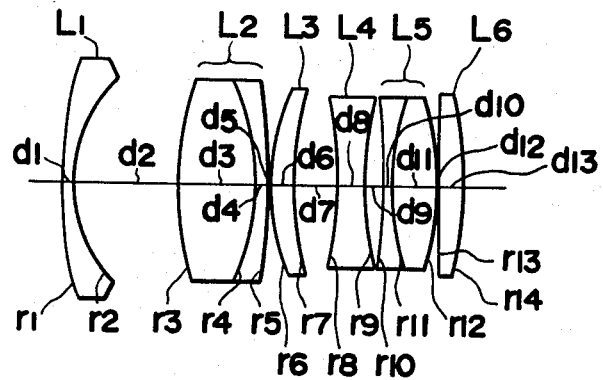
FIG. 3 is a schematic cross-sectional view of a second embodiment of the present invention.

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention have been defined herein specifically to provide a wide angle lens system of an inverted telephoto type having a high-speed characteristic in a relatively compact size.

The present invention represents the parameters of a compromise balance of acceptable aberrations in an inverted telephoto lens system for utilization with a 35 mm camera.

In the accompanying drawings which supplement the following tables, the lenses in accordance with the present invention are illustrated diagrammatically. As usual, in conventional lens diagrams, light is assumed to travel from left to right. The individual lens groups are designated by the letter L with a subscript number corresponding to the consecutive numbers of the lens elements from image to object side. The lens elements themselves can be considered either a single element or a combination such as a doublet. The radii of curvature of the lenses are indicated by r, with a subscript corresponding to consecutive numbers of the lens elements. The axial spacings, d, along the optical axis are set forth both in the tables and in the drawings and include both the axial spacings between the lens elements and the thickness of the lens elements. Finally, the refractive index, N, and Abbe number, $\nu$, are provided in each of the tables. Since the specific lens parameters are provided herein to meet the requirements of a full disclosure adequate to convey the present invention to a lens designer, they should not be construed as limiting to any specific lens design as set forth in an individual embodiment.

Figure 7:
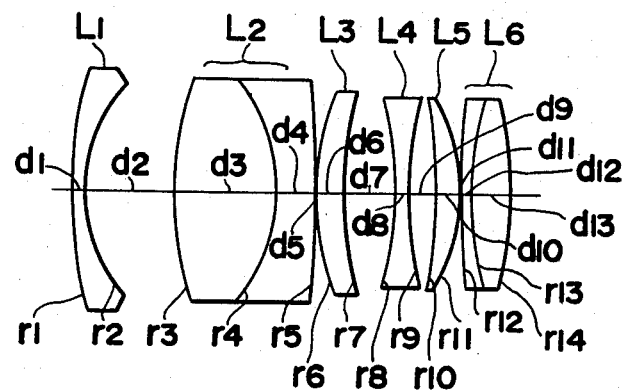
FIG. 7 is a schematical cross-sectional view of the fourth embodiment of the present invention.
Figure 9:
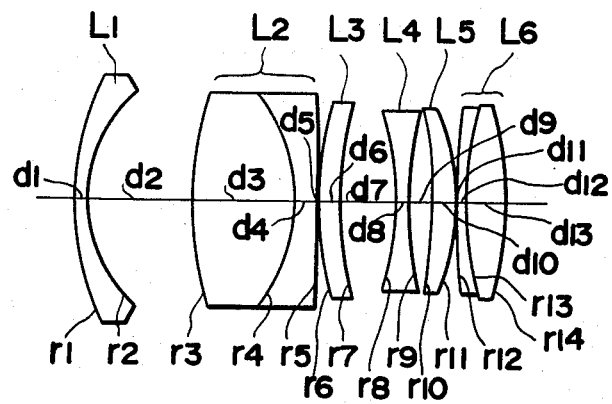
FIG. 9 is a schematical cross-sectional view of the fifth embodiment of the present invention.

Five specific embodiments of the present invention are disclosed respectively in FIGS. 1, 3, 5, 7 and 9. In each of these wide angle lens systems of the inverted telephoto type, six separate lens groups consist of a first front lens group $L_1$ consisting of a negative meniscus single lens element convex to the object side; a second lens group $L_2$ consisting of a positive doublet element formed by cementing two lens sub-elements to provide a cemented intermediate surface concave to the object side; a third lens group $L_3$ consisting of a positive meniscus single lens element convex to the object side; a fourth lens group $L_4$ consisting of a biconcave single lens element; a fifth lens group $L_5$ consisting of one positive lens element; and a sixth lens rear group $L_6$ consisting of one positive lens element. One of the positive lens elements of the fifth and sixth lens groups $L_5$ and $L_6$ is a single lens element, while the other is a doublet element formed by cementing two sub-elements.

The wide angle inverted telephoto lens system further fulfills the following conditions;

$1.5 < r_1/r_2 < 4.0$ (1);

$0.12 < N_2 - N_3 < 0.25$ (2);

$0.5f < |r_4| < 0.75f, r_4 < 0$ (3);

$1.2f < f_{1-2} < 2.0\,f$ (4);

$15 < \nu_{II} - \nu_I < 30$ (5)

wherein $r_1$ and $r_2$ represent the radii of curvature of the object side and the image side surfaces of the negative single lens element in the first lens group $L_1$, respectively; $N_2$ and $N_3$ represent the refractive indices of the object side lens sub-element and the image side lens sub-element forming the positive doublet element in the second lens group $L_2$; $r_4$ represents the radius of curvature of the cemented intermediate surface of the positive doublet element in the second lens group $L_2$; $f_{1-2}$ represents the composite focal length of the first and second lens groups $L_1$ and $L_2$; f represents the total focal length of the whole lens system; and $\nu_I$ and $\nu_{II}$ represent Abbe numbers of the object side lens sub-element and the image side lens sub-element forming the doublet element in the one of the fifth and sixth lens groups, $L_5$ and $L_6$.

The above mentioned condition (1) determines the refractive power of the negative meniscus lens element in the first front lens group $L_1$ for minimizing the undesirable abberations created by holding the lens system to a compact configuration. If $r_1/r_2$ increased beyond the cited upper limit, the negative distortion and the negative coma would be increasingly generated since the negative refractive power of $L_1$ would be excessively increased. In this case, the negative distortion and the negative coma generated at the first lens group $L_1$ would be difficult to correct by any feasible design of the succeeding lens groups $L_2$ to $L_6$. Alternatively, a desired back focal distance cannot be maintained because of the diminished negative refractive power available to the first lens group $L_1$ if $r_1/r_2$ decreases below the lower limit of condition (1).

According to the design parameters of the present invention, the negative refractive power which is to be distributed at the front of the inverted telephoto lens system is realized only by the first front lens group $L_1$ consisting of one negative meniscus single lens element. Thus the occurrence of negative distortion and negative coma are incapable of being sufficiently corrected only by complying with condition (1). To correct the remainder of the abberations after the first front lens group $L_1$, the second lens group $L_2$ is constructed of a doublet element having a cemented intermediate surface $r_4$ concave to the object side and conditions (2) and (3) must be adhered to. Conditions (2) and (3) define the cemented intermediate surface $r_4$ to be of a relatively large positive refractive power. Further, the doublet element in the second group $L_2$ decreases the Petzval sum of the lens system to improve the field curvature and to correct spherical aberration to permit a greater aperture ratio.

With respect to condition (2), if $N_2 - N_3$ increases beyond the cited upper limit, the spherical aberration will be under corrected and additional aberrations relating to the higher order of aberration coefficients are generated although it may be possible to decrease the Petzval sum. If $N_2 - N_3$ decreases beyond the lower limit of condition (2), the ability of the cemented intermediate surface to correct the negative distortion and the negative coma is diminished and spherical aberration is over corrected.

The positive refractive power of the cemented intermediate surface $r_4$ is excessively decreased which results in insufficient ability to correct the remainder of the aberrations at the first group $L_1$ if $|r_4|$ is increased beyond the upper limit of condition (3). In contrast thereto, the positive refractive power of the cemented intermediate surface $r_4$ is excessively increased to disturb the balances in spherical aberration and coma if the lower limit of condition (3) is violated.

Condition (4) is necessary to make the lens system compact while maintaining a desired back focal distance and defines the balance between the refractive powers of the first and second lens groups $L_1$ and $L_2$. Providing excessively weak power to the second lens group $L_2$ relative to that of the first lens group $L_1$ means that $f_{1-2}$ would increase beyond the upper limit of condition (4), which results in the incapability of correcting distortion and coma. On the contrary, a decrease of $f_{1-2}$ beyond the lower limit of condition (4) is accompanied by an excessive strong power of the second group $L_2$ which would not permit the maintenance of the desired back focal distance. In this case, it may be possible to recover a sufficient amount of back focal distance by increasing the air space $d_2$ between the first and second lens groups $L_1$ and $L_2$. However, this correction would conflict with the objects of the present invention, which is to make the system compact.

Each of the lens systems of the present invention have a doublet element in one of the fifth and sixth groups $L_5$ and $L_6$. Further, the inventive doublet elements is required to fulfill condition (5). This is to avoid an excessive dependence on the fourth group $L_4$ to correct chromatic aberration. Accordingly, the biconcave single lens element in the fourth group $L_4$ can be composed of a glass material of relatively low refractive index to decrease the Petzval sum. Further, the use of a glass material of relatively low refractive index for the fourth group $L_4$ is favorable to the correction of spherical aberration. A doublet element in which $\nu_{II} - \nu_I$ is greater than the upper limit of condition (5) may be favorable to the correction of the chromatic aberration however, the Petzval sum could not be improved since it is incapable to use a glass material of a higher refractive index for the positive sub-element of the doublet. On the contrary, the ability of the doublet to correct chromatic aberration will decrease to a meaningless value in case of a doublet in which $\nu_{II} - \nu_I$ is less than the lower limit of condition (5).

The following Tables 1 to 5 show the first to fifth embodiments of the present invention, respectively.

Table 1

(Embodiment 1)
$f = 100.0$    $F_{No.} = 2.0$    $2\omega = 64°$

| Radius of Curvature | Axial Distance | Refractive Index | Abbe Number |
|---|---|---|---|
| $r_1 = 145.126$ | | | |
| | $d_1 = 4.13$ | $N_1 = 1.5714$ | $\nu_1 = 57.2$ |
| $r_2 = 46.336$ | | | |
| | $d_2 = 28.13$ | | |
| $r_3 = 102.114$ | | | |
| | $d_3 = 36.09$ | $N_2 = 1.7725$ | $\nu_2 = 50.1$ |
| $r_4 = -60.967$ | | | |
| | $d_4 = 10.26$ | $N_3 = 1.5714$ | $\nu_3 = 26.7$ |
| $r_5 = -555.989$ | | | |
| | $d_5 = 0.33$ | | |
| $r_6 = 101.782$ | | | |
| | $d_6 = 7.02$ | $N_4 = 1.7579$ | $\nu_4 = 48.0$ |
| $r_7 = 114.881$ | | | |
| | $d_7 = 15.95$ | | |
| $r_8 = -91.386$ | | | |
| | $d_8 = 5.00$ | $N_5 = 1.7006$ | $\nu_5 = 30.0$ |
| $r_9 = 138.455$ | | | |
| | $d_9 = 6.24$ | | |
| $r_{10} = -138.077$ | | | |
| | $d_{10} = 6.30$ | $N_6 = 1.7885$ | $\nu_6 = 46.1$ |
| $r_{11} = -66.561$ | | | |
| | $d_{11} = 0.33$ | | |
| $r_{12} = 696.407$ | | | |
| | $d_{12} = 3.00$ | $N_7 = 1.8052$ | $\nu_7 = 25.2$ ($\nu_I$) |
| $r_{13} = 102.004$ | | | |
| | $d_{13} = 14.48$ | $N_8 = 1.7883$ | $\nu_8 = 47.7$ ($\nu_{II}$) |
| $r_{14} = -111.541$ | | | |

Table 2

(Embodiment 2)
$f = 100.0$    $F_{No.} = 2.0$    $2\omega = 64°$

| Radius of Curvature | Axial Distance | Refractive Index | Abbe Number |
|---|---|---|---|
| $r_1 = 149.520$ | | | |
| | $d_1 = 4.13$ | $N_1 = 1.5688$ | $\nu_1 = 56.0$ |
| $r_2 = 48.443$ | | | |
| | $d_2 = 34.94$ | | |
| $r_3 = 110.406$ | | | |
| | $d_3 = 26.08$ | $N_2 = 1.7725$ | $\nu_2 = 50.1$ |
| $r_4 = -67.660$ | | | |
| | $d_4 = 4.37$ | $N_3 = 1.6172$ | $\nu_3 = 54.1$ |
| $r_5 = -263.527$ | | | |
| | $d_5 = 0.33$ | | |
| $r_6 = 84.689$ | | | |
| | $d_6 = 8.05$ | $N_4 = 1.7570$ | $\nu_4 = 48.0$ |
| $r_7 = 105.198$ | | | |
| | $d_7 = 14.78$ | | |
| $r_8 = -134.436$ | | | |
| | $d_8 = 9.45$ | $N_5 = 1.6997$ | $\nu_5 = 34.8$ |
| $r_9 = 97.667$ | | | |
| | $d_9 = 6.40$ | | |
| $r_{10} = -234.924$ | | | |
| | $d_{10} = 3.00$ | $N_6 = 1.8052$ | $\nu_6 = 25.2$ ($\nu_I$) |
| $r_{11} = 92.306$ | | | |

Table 2-continued (Embodiment 2)
$f = 100.0$    $F_{No.} = 2.0$    $2\omega = 64°$

| Radius of Curvature | Axial Distance | Refractive Index | Abbe Number |
|---|---|---|---|
| | $d_{11} = 15.00$ | $N_7 = 1.7570$ | $\nu_7 = 48.0$ ($\nu_{II}$) |
| $r_{12} = -75.752$ | | | |
| | $d_{12} = 0.33$ | | |
| $r_{13} = 4870.890$ | | | |
| | $d_{13} = 8.08$ | $N_8 = 1.7856$ | $\nu_8 = 43.0$ |
| $r_{14} = -140.806$ | | | |

Table 3

(Embodiment 3)
$f = 100.0$    $F_{No.} = 1.8$    $2\omega = 64°$

| Radius of Curvature | Axial Distance | Refractive Index | Abbe Number |
|---|---|---|---|
| $r_1 = 177.343$ | | | |
| | $d_1 = 4.13$ | $N_1 = 1.5714$ | $\nu_1 = 52.7$ |
| $r_2 = 51.168$ | | | |
| | $d_2 = 34.85$ | | |
| $r_3 = 119.752$ | | | |
| | $d_3 = 29.05$ | $N_2 = 1.7725$ | $\nu_2 = 50.1$ |
| $r_4 = -68.460$ | | | |
| | $d_4 = 6.98$ | $N_3 = 1.6172$ | $\nu_3 = 54.1$ |
| $r_5 = -266.304$ | | | |
| | $d_5 = 0.33$ | | |
| $r_6 = 89.035$ | | | |
| | $d_6 = 7.96$ | $N_4 = 1.7570$ | $\nu_4 = 48.0$ |
| $r_7 = 111.312$ | | | |
| | $d_7 = 16.40$ | | |
| $r_8 = -161.294$ | | | |
| | $d_8 = 11.38$ | $N_5 = 1.6398$ | $\nu_5 = 34.6$ |
| $r_9 = 96.801$ | | | |
| | $d_9 = 8.42$ | | |
| $r_{10} = -259.252$ | | | |
| | $d_{10} = 3.00$ | $N_6 = 1.8052$ | $\nu_6 = 25.2$ ($\nu_I$) |
| $r_{11} = 105.488$ | | | |
| | $d_{11} = 15.18$ | $N_7 = 1.7495$ | $\nu_7 = 50.4$ ($\nu_{II}$) |
| $r_{12} = -82.211$ | | | |
| | $d_{12} = 0.33$ | | |
| $r_{13} = 523.503$ | | | |
| | $d_{13} = 8.08$ | $N_8 = 1.7856$ | $\nu_8 = 43.0$ |
| $r_{14} = -190.489$ | | | |

Table 4

(Embodiment 4)
$f = 100.0$    $F_{No.} = 1.8$    $2\omega = 64°$

| Radius of Curvature | Axial Distance | Refractive Index | Abbe Number |
|---|---|---|---|
| $r_1 = 154.848$ | | | |
| | $d_1 = 4.13$ | $N_1 = 1.5697$ | $\nu_1 = 49.3$ |
| $r_2 = 47.717$ | | | |
| | $d_2 = 29.95$ | | |
| $r_3 = 116.247$ | | | |
| | $d_3 = 35.07$ | $N_2 = 1.7725$ | $\nu_2 = 50.1$ |
| $r_4 = -58.237$ | | | |
| | $d_4 = 13.06$ | $N_3 = 1.5890$ | $\nu_3 = 48.6$ |
| $r_5 = -461.944$ | | | |
| | $d_5 = 0.33$ | | |
| $r_6 = 97.093$ | | | |
| | $d_6 = 8.53$ | $N_4 = 1.7570$ | $\nu_4 = 48.0$ |
| $r_7 = 106.274$ | | | |
| | $d_7 = 18.05$ | | |
| $r_8 = -90.705$ | | | |
| | $d_8 = 5.00$ | $N_5 = 1.6398$ | $\nu_5 = 34.6$ |
| $r_9 = 145.370$ | | | |
| | $d_9 = 8.42$ | | |
| $r_{10} = -185.567$ | | | |
| | $d_{10} = 7.95$ | $N_6 = 1.7850$ | $\nu_6 = 50.4$ |
| $r_{11} = -69.947$ | | | |
| | $d_{11} = 0.33$ | | |
| $r_{12} = 375.427$ | | | |
| | $d_{12} = 3.00$ | $N_7 = 1.8052$ | $\nu_7 = 25.2$ ($\nu_I$) |
| $r_{13} = 90.403$ | | | |
| | $d_{13} = 13.50$ | $N_8 = 1.7495$ | $\nu_8 = 50.4$ |

Table 4-continued
(Embodiment 4)

| f = 100.0 | | $F_{No.} = 1.8$ | | $2\omega = 64°$ |
|---|---|---|---|---|
| Radius of Curvature | | Axial Distance | Refractive Index | Abbe Number |
| $r_{14}$ = | −147.336 | | | ($\nu_{II}$) |

Table 5
(Embodiment 5)

| f = 100.0 | | | $F_{No.} = 1.8$ | | $2\omega = 64°$ |
|---|---|---|---|---|---|
| Radius of Curvature | | Axial Distance | | Refractive Index | Abbe Number |
| $r_1$ = | 99.599 | | | | |
| | | $d_1$ = | 4.13 | $N_1 = 1.5699$ | $\nu_1 = 48.0$ |
| $r_2$ = | 45.656 | | | | |
| | | $d_2$ = | 35.84 | | |
| $r_3$ = | 120.226 | | | | |
| | | $d_3$ = | 34.94 | $N_2 = 1.7883$ | $\nu_2 = 47.7$ |
| $r_4$ = | −59.547 | | | | |
| | | $d_4$ = | 7.90 | $N_3 = 1.5710$ | $\nu_3 = 50.9$ |
| $r_5$ = | −1164.245 | | | | |
| | | $d_5$ = | 0.42 | | |
| $r_6$ = | 132.776 | | | | |
| | | $d_6$ = | 7.00 | $N_4 = 1.7570$ | $\nu_4 = 48.0$ |
| $r_7$ = | 141.043 | | | | |
| | | $d_7$ = | 18.85 | | |
| $r_8$ = | −83.962 | | | | |
| | | $d_8$ = | 5.00 | $N_5 = 1.7006$ | $\nu_5 = 30.0$ |
| $r_9$ = | 161.142 | | | | |
| | | $d_9$ = | 6.90 | | |
| $r_{10}$ = | −142.461 | | | | |
| | | $d_{10}$ = | 7.85 | $N_6 = 1.7883$ | $\nu_6 = 47.7$ |
| $r_{11}$ = | −67.804 | | | | |
| | | $d_{11}$ = | 0.42 | | |
| $r_{12}$ = | 348.652 | | | | |
| | | $d_{12}$ = | 3.00 | $N_7 = 1.8052$ | $\nu_7 = 25.2$ ($\nu_I$) |
| $r_{13}$ = | 102.967 | | | | |
| | | $d_{13}$ = | 13.50 | $N_8 = 1.7725$ | $\nu_8 = 50.1$ ($\nu_{II}$) |
| $r_{14}$ = | −122.555 | | | | |

Figure 4A:
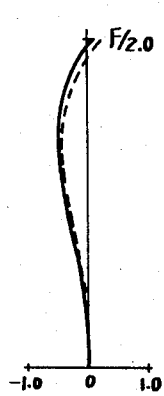
FIGS. 4a, 4b and 4c are graphical plots of the aberrations of the second embodiment.
Figure 4B:
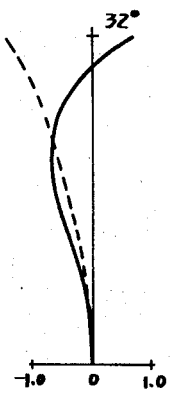
Figure 4C:
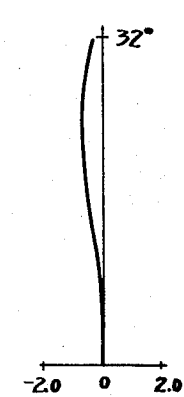
Figure 8A:
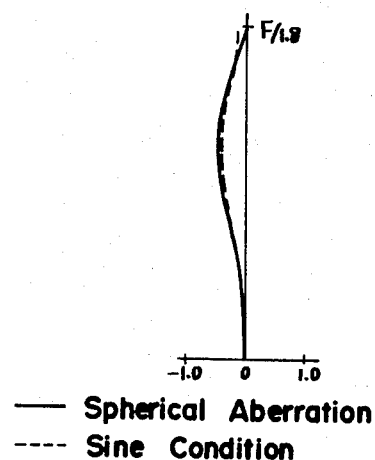
FIGS. 8a, 8b and 8c are graphical plots of the aberrations of the fourth embodiment.
Figure 8B:
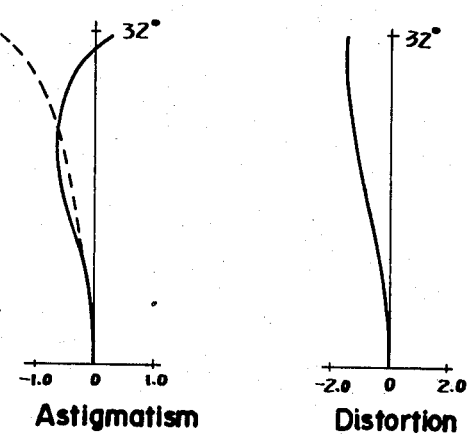
Figure 8C:
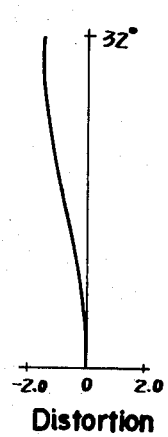
Figure 10A:
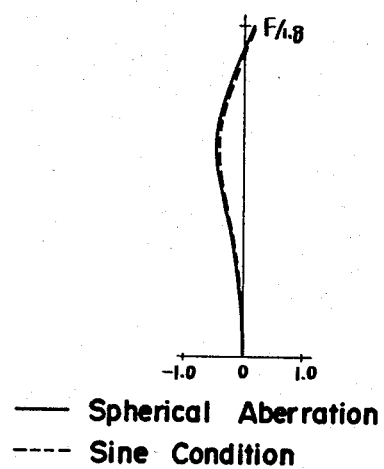
FIGS. 10a, 10b and 10c are graphical plots of the aberrations of the fifth embodiment.
Figure 10B:
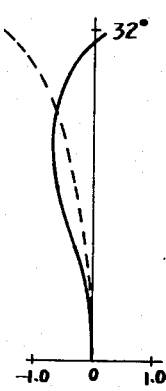
Figure 10C:
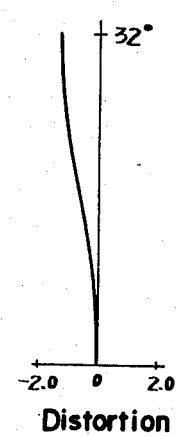

In the above tables the spherical aberration, sine condition, astigmatism and distortion are plotted for each of the five embodiments in respectively FIGS. 2, 4, 6, 8 and 10.

By adhering to the parameters and design considerations set forth in the above specification, a lens designer in the optical field is capable of providing a wide angle lens system of an inverted telephoto type. While the parameters of the present invention can be found in the above examples, the examples should not be considered limiting but rather illustrative of the advantages of the present invention.

What is claimed is:

1. A wide angle lens system of an inverted telephoto type comprising six separate lens groups consisting, consecutively from the object to the image side, of:
   a first front group consisting of a negative meniscus single lens element convex to the object side;
   a second group consisting of a positive doublet element formed by cementing two sub-elements having a cemented intermediate surface concave to the object side;
   a third group consisting of a positive meniscus single lens element convex to the object side;
   a fourth group consisting of a biconcave single lens element;
   a fifth group consisting of one positive lens element; and
   a sixth rear group consisting of one positive lens element, one of the positive lens elements of the fifth and sixth groups being a single lens element, while the other being a doublet element formed by cementing two sub-elements.

2. The invention of claim 1 further fulfilling the following conditions:

$1.5 < r_1/r_2 < 4.0;$ $0.12 < N_2 - N_3 < 0.25;$ $0.5f < |r_4| < 0.75f, r_4 < 0;$ $1.2f < f_{1-2} < 2.0 f;$ $15 < \nu_{II} - \nu_I < 30$ wherein, $r_1$ and $r_2$ represent the radii of curvature of the object side and the image side surfaces of the negative single lens element in the first group, respectively; $N_2$ and $N_3$ represent the refractive indices of the respective object side sub-element and the image side sub-element forming the positive doublet element in the second group; $r_4$ represents the radius of curvature of the cemented intermediate surface of the positive doublet element in the second group; $f_{1-2}$ represents the composite focal length of the first and second groups; f represents the total focal length of the whole lens system; and $\nu_I$ and $\nu_{II}$ represent Abbe numbers of the respective object side sub-element and the image side sub-element forming the doublet element in one of the fifth and sixth groups.

3. The invention of claim 1, wherein the positive lens element in the fifth group is a single lens element, while the positive lens element in the sixth rear group is a doublet element.

4. The invention of claim 1, wherein the positive lens element in the fifth group is a doublet element, while the positive lens element in the sixth rear group is a single lens element.

5. The invention of claim 1, wherein the positive lens element in the fifth group is a positive meniscus lens element convex to the image side and the positive lens element in the sixth rear group is a biconvex lens element.

6. A wide angle inverted telephoto lens system comprising the following design parameters;

| f = 100.0 | | | $F_{No.} = 2.0$ | | $2\omega = 64°$ |
|---|---|---|---|---|---|
| Radius of Curvature | | Axial Distance | | Refractive Index | Abbe Number |
| $r_1$ = | 145.126 | | | | |
| | | $d_1$ = | 4.13 | $N_1 = 1.5714$ | $\nu_1 = 57.2$ |
| $r_2$ = | 46.336 | | | | |
| | | $d_2$ = | 28.13 | | |
| $r_3$ = | 102.114 | | | | |
| | | $d_3$ = | 36.09 | $N_2 = 1.7725$ | $\nu_2 = 50.1$ |
| $r_4$ = | −60.967 | | | | |
| | | $d_4$ = | 10.26 | $N_3 = 1.5714$ | $\nu_3 = 26.7$ |
| $r_5$ = | −555.989 | | | | |
| | | $d_5$ = | 0.33 | | |
| $r_6$ = | 101.782 | | | | |
| | | $d_6$ = | 7.02 | $N_4 = 1.7570$ | $\nu_4 = 48.0$ |
| $r_7$ = | 114.881 | | | | |
| | | $d_7$ = | 15.95 | | |
| $r_8$ = | −91.386 | | | | |
| | | $d_8$ = | 5.00 | $N_5 = 1.7006$ | $\nu_5 = 30.0$ |
| $r_9$ = | 138.455 | | | | |
| | | $d_9$ = | 6.24 | | |
| $r_{10}$ = | −138.077 | | | | |
| | | $d_{10}$ = | 6.30 | $N_6 = 1.7885$ | $\nu_6 = 46.1$ |
| $r_{11}$ = | −66.561 | | | | |
| | | $d_{11}$ = | 0.33 | | |
| $r_{12}$ = | 696.407 | | | | |

-continued

| f = 100.0 | | $F_{No.}$ = 2.0 | | $2\omega = 64°$ | |
|---|---|---|---|---|---|
| Radius of Curvature | | Axial Distance | Refractive Index | Abbe Number | |
| | | $d_{12}$ = | 3.00 $N_7$ = 1.8052 | $\nu_7$ = 25.2 | |
| $r_{13}$ = | 102.004 | | | | |
| | | $d_{13}$ = | 14.48 $N_8$ = 1.7883 | $\nu_8$ = 47.7 ($\nu_{II}$) | |
| $r_{14}$ = | −111.541 | | | | |

7. A wide angle inverted telephoto lens system comprising the following design parameters;

| f = 100.0 | | $F_{No.}$ = 2.0 | | $2\omega = 64°$ |
|---|---|---|---|---|
| Radius of Curvature | | Axial Distance | Refractive Index | Abbe Number |
| $r_1$ = | 149.520 | | | |
| | | $d_1$ = 4.13 | $N_1$ = 1.5688 | $\nu_1$ = 56.0 |
| $r_2$ = | 48.443 | | | |
| | | $d_2$ = 34.94 | | |
| $r_3$ = | 110.406 | | | |
| | | $d_3$ = 26.08 | $N_2$ = 1.7725 | $\nu_2$ = 50.1 |
| $r_4$ = | −67.660 | | | |
| | | $d_4$ = 4.37 | $N_3$ = 1.6172 | $\nu_3$ = 54.1 |
| $r_5$ = | −263.527 | | | |
| | | $d_5$ = 0.33 | | |
| $r_6$ = | 84.689 | | | |
| | | $d_6$ = 8.05 | $N_4$ = 1.7570 | $\nu_4$ = 48.0 |
| $r_7$ = | 105.198 | | | |
| | | $d_7$ = 14.78 | | |
| $r_8$ = | −134.436 | | | |
| | | $d_8$ = 9.45 | $N_5$ = 1.6997 | $\nu_5$ = 34.8 |
| $r_9$ = | 97.667 | | | |
| | | $d_9$ = 6.40 | | |
| $r_{10}$ = | −234.924 | | | |
| | | $d_{10}$ = 3.00 | $N_6$ = 1.8052 | $\nu_6$ = 25.2 ($\nu_I$) |
| $r_{11}$ = | 92.306 | | | |
| | | $d_{11}$ = 15.00 | $N_7$ = 1.7570 | $\nu_7$ = 48.0 ($\nu_{II}$) |
| $r_{12}$ = | −75.752 | | | |
| | | $d_{12}$ = 0.33 | | |
| $r_{13}$ = | 4870.890 | | | |
| | | $d_{13}$ = 8.08 | $N_8$ = 1.7856 | $\nu_8$ = 43.0 |
| $r_{14}$ = | −140.806 | | | |

8. A wide angle inverted telephoto lens system comprising the following design parameters;

| f = 100.0 | | $F_{No.}$ = 1.8 | | $2\omega = 64°$ |
|---|---|---|---|---|
| Radius of Curvature | | Axial Distance | Refractive Index | Abbe Number |
| $r_1$ = | 177.343 | | | |
| | | $d_1$ = 4.13 | $N_1$ = 1.5714 | $\nu_1$ = 52.7 |
| $r_2$ = | 51.168 | | | |
| | | $d_2$ = 34.85 | | |
| $r_3$ = | 119.752 | | | |
| | | $d_3$ = 29.05 | $N_2$ = 1.7725 | $\nu_2$ = 50.1 |
| $r_4$ = | 68.460 | | | |
| | | $d_4$ = 6.98 | $N_3$ = 1.6172 | $\nu_3$ = 54.1 |
| $r_5$ = | −266.304 | | | |
| | | $d_5$ = 0.33 | | |
| $r_6$ = | 89.035 | | | |
| | | $d_6$ = 7.96 | $N_4$ = 1.7570 | $\nu_4$ = 48.0 |
| $r_7$ = | 111.312 | | | |
| | | $d_7$ = 16.40 | | |
| $r_8$ = | −161.294 | | | |
| | | $d_8$ = 11.38 | $N_5$ = 1.6398 | $\nu_5$ = 34.6 |
| $r_9$ = | 96.801 | | | |
| | | $d_9$ = 8.42 | | |
| $r_{10}$ = | −259.252 | | | |
| | | $d_{10}$ = 3.00 | $N_6$ = 1.8052 | $\nu_6$ = 25.2 ($\nu_I$) |
| $r_{11}$ = | 105.488 | | | |
| | | $d_{11}$ = 15.18 | $N_7$ = 1.7495 | $\nu_7$ = 50.4 ($\nu_{II}$) |
| $r_{12}$ = | −82.211 | | | |

-continued

| f = 100.0 | | $F_{No.}$ = 1.8 | | $2\omega = 64°$ |
|---|---|---|---|---|
| Radius of Curvature | | Axial Distance | Refractive Index | Abbe Number |
| | | $d_{12}$ = 0.33 | | |
| $r_{13}$ = | 523.503 | | | |
| | | $d_{13}$ = 8.08 | $N_8$ = 1.7856 | $\nu_8$ = 43.0 |
| $r_{14}$ = | −190.489 | | | |

9. A wide angle inverted telephoto lens system comprising the following design parameters;

| f = 100.0 | | $F_{No.}$ = 1.8 | | $2\omega = 64°$ |
|---|---|---|---|---|
| Radius of Curvature | | Axial Distance | Refractive Index | Abbe Number |
| $r_1$ = | 154.848 | | | |
| | | $d_1$ = 4.13 | $N_1$ = 1.5697 | $\nu_1$ = 49.3 |
| $r_2$ = | 47.717 | | | |
| | | $d_2$ = 29.95 | | |
| $r_3$ = | 116.247 | | | |
| | | $d_3$ = 35.07 | $N_2$ = 1.7725 | $\nu_2$ = 50.1 |
| $r_4$ = | −58.237 | | | |
| | | $d_4$ = 13.06 | $N_3$ = 1.5890 | $\nu_3$ = 48.6 |
| $r_5$ = | −461.944 | | | |
| | | $d_5$ = 0.33 | | |
| $r_6$ = | 97.093 | | | |
| | | $d_6$ = 8.53 | $N_4$ = 1.7570 | $\nu_4$ = 48.0 |
| $r_7$ = | 106.274 | | | |
| | | $d_7$ = 18.05 | | |
| $r_8$ = | −90.705 | | | |
| | | $d_8$ = 5.00 | $N_5$ = 1.6398 | $\nu_5$ = 34.6 |
| $r_9$ = | 145.370 | | | |
| | | $d_9$ = 8.42 | | |
| $r_{10}$ = | −185.567 | | | |
| | | $d_{10}$ = 7.95 | $N_6$ = 1.7850 | $\nu_6$ = 50.4 |
| $r_{11}$ = | −69.947 | | | |
| | | $d_{11}$ = 0.33 | | |
| $r_{12}$ = | 375.427 | | | |
| | | $d_{12}$ = 3.00 | $N_7$ = 1.8052 | $\nu_7$ = 25.2 ($\nu_I$) |
| $r_{13}$ = | 90.403 | | | |
| | | $d_{13}$ = 13.50 | $N_8$ = 1.7495 | $\nu_8$ = 50.4 ($\nu_{II}$) |
| $r_{14}$ = | −147.336 | | | |

10. A wide angle inverted telephoto lens system comprising the following design parameters;

| f = 100.0 | | $F_{No.}$ = 1.8 | | $2\omega = 64°$ |
|---|---|---|---|---|
| Radius of Curvature | | Axial Distance | Refractive Index | Abbe Number |
| $r_1$ = | 99.599 | | | |
| | | $d_1$ = 4.13 | $N_1$ = 1.5699 | $\nu_1$ = 48.0 |
| $r_2$ = | 45.656 | | | |
| | | $d_2$ = 35.84 | | |
| $r_3$ = | 120.226 | | | |
| | | $d_3$ = 34.94 | $N_2$ = 1.7883 | $\nu_2$ = 47.7 |
| $r_4$ = | −59.547 | | | |
| | | $d_4$ = 7.90 | $N_3$ = 1.5710 | $\nu_3$ = 50.9 |
| $r_5$ = | −1164.245 | | | |
| | | $d_5$ = 0.42 | | |
| $r_6$ = | 132.776 | | | |
| | | $d_6$ = 7.00 | $N_4$ = 1.7570 | $\nu_4$ = 48.0 |
| $r_7$ = | 141.043 | | | |
| | | $d_7$ = 18.85 | | |
| $r_8$ = | −83.962 | | | |
| | | $d_8$ = 5.00 | $N_5$ = 1.7006 | $\nu_5$ = 30.0 |
| $r_9$ = | 161.142 | | | |
| | | $d_9$ = 6.90 | | |
| $r_{10}$ = | −142.461 | | | |
| | | $d_{10}$ = 7.85 | $N_6$ = 1.7883 | $\nu_6$ = 47.7 |
| $r_{11}$ = | −67.804 | | | |
| | | $d_{11}$ = 0.42 | | |
| $r_{12}$ = | 348.652 | | | |
| | | $d_{12}$ = 3.00 | $N_7$ = 1.8052 | $\nu_7$ = 25.2 ($\nu_I$) |
| $r_{13}$ = | 102.967 | | | |
| | | $d_{13}$ = 13.50 | $N_8$ = 1.7725 | $\nu_8$ = 50.1 ($\nu_{II}$) |
| $r_{14}$ = | −122.555 | | | |

\* \* \* \* \*

UNITED STATES PATENT AND TRADEMARK OFFICE
CERTIFICATE OF CORRECTION

PATENT NO.   : 4,174,886
DATED        : November 20, 1979
INVENTOR(S)  : Akiyoshi Nakamura It is certified that error appears in the above–identified patent and that said Letters Patent are hereby corrected as shown below:

Column 9, line 6, delete "$\nu_7 = 25.2$" and insert --$\nu_7 = 25.2(\nu_I)$--.

*Signed and Sealed this*

*Twenty-ninth* Day of *April 1980*

[SEAL]

Attest:

SIDNEY A. DIAMOND

*Attesting Officer*   *Commissioner of Patents and Trademarks*